(12) United States Patent
Chou

(10) Patent No.: US 7,541,568 B2
(45) Date of Patent: Jun. 2, 2009

(54) IMAGE SENSOR AND RELATED METHOD WITH FUNCTIONS OF REPAIRING COLUMN READOUT CIRCUITS

(75) Inventor: Kuo-Yu Chou, Hsin-Chu Hsien (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 15 days.

(21) Appl. No.: 12/021,308

(22) Filed: Jan. 29, 2008

(65) Prior Publication Data

US 2009/0108177 A1 Apr. 30, 2009

(30) Foreign Application Priority Data

Oct. 25, 2007 (TW) ............... 96140044 A

(51) Int. Cl.
*H01L 27/00* (2006.01)
(52) U.S. Cl. ............... 250/208.1; 250/214 R
(58) Field of Classification Search ............ 250/208.1, 250/214 R, 559.1; 257/290–294, 440; 348/294–312
See application file for complete search history.

(56) References Cited

U.S. PATENT DOCUMENTS 5,965,871 A * 10/1999 Zhou et al. ............... 250/208.1
2006/0261255 A1 11/2006 Raynor \* cited by examiner

*Primary Examiner*—Que T Le
(74) *Attorney, Agent, or Firm*—Winston Hsu

(57) ABSTRACT

An image sensor capable of repairing column readout circuits includes a pixel array, a column readout circuit array, an addressing unit and a repairing unit. The column readout circuit array includes a plurality of column readout circuit group and a redundant column readout circuit group, which is placed on a side of the plurality of column readout circuit groups and consists of a specific number of redundant column readout circuits. The repairing unit is utilized for shifting in order pixel column groups, which are originally coupled to column readout circuit groups starting from a first column readout circuit group having defects, to couple to the column readout circuit groups next to the first column readout circuit group and the redundant column readout circuit group.

14 Claims, 8 Drawing Sheets

IMAGE SENSOR AND RELATED METHOD WITH FUNCTIONS OF REPAIRING COLUMN READOUT CIRCUITS

BACKGROUND OF THE INVENTION

1. Field of the Invention

The present invention relates to an image sensor and related method with functions of repairing column readout circuits, and more particularly, to an image sensor and related method for repairing column readout circuits by shifting them in order on a group basis.

2. Description of the Prior Art

As the development of electronic products such as digital cameras and mobile phones progresses, the demand for image sensors increases accordingly. In general, image sensors in common usages nowadays are divided into two main categories: charge coupled device (CCD) sensors and CMOS image sensors (CIS). Primarily, CMOS image sensors have certain advantages of low operating voltages, low power consumption, and an ability for random access. Furthermore, CMOS image sensors are currently capable of integration with the semiconductor fabrication process. Based on those benefits, the application of CMOS image sensors has increased significantly.

Please refer to FIG. 1. FIG. 1 is a schematic diagram of a conventional CMOS image sensor 10. The CMOS image sensor 10 includes a pixel array 11, a column readout circuit array 12, a row decoder 13, a column decoder 14 and an analog to digital converter 15. The pixel array 11 includes pixel units P11~Pmn arranged in a matrix form. Each of the pixel units P11~Pmn has a light-sensing region and a peripheral circuit region (not shown in FIG. 1.) The light-sensing region is utilized for sensing incident light and accumulating photo charges that are generated due to the incident light. The peripheral circuit is utilized for properly outputting signals generated by the light-sensing region according to control signals of the row decoder 13 and the column decoder 14. The column readout circuit array 12 is arranged below the pixel array 11, and includes column readout circuits 120_1~120_n. Each column readout circuits 120 is individually coupled to a corresponding column of the pixel array 11, and is utilized for reading signals outputted from the corresponding column. The analog to digital converter 15 is arranged on a side of the pixel array 11, and is utilized for performing signal processing such as analog-to-digital conversion for signals outputted by the column readout circuits 120_1~120_n, successively.

As well known by those skilled in the art, each column readout circuit 120 can be a simple voltage or charge amplifier, or can further be realized by a correlation double sampling (CDS) circuit. However, if one or some column readout circuits in the column readout circuit array 12 have defects such as short circuit, open circuit or impedance mismatch due to fall of particles or process deviation during the fabrication process of the CMOS image sensor, causing such column readout circuits to not work normally, the entire column of pixels in the pixel array 11 corresponding to such column readout circuits cannot output correct signals accordingly. As a result, image quality of the CMOS image sensor is reduced, which increases the difficulty of following image processing, and even chip failure will occur.

Therefore, for the above-mentioned problem, US Patent Publication No. 2006/0261255, entitled "IMAGE SENSOR", discloses an image sensor, which utilizes a redundant readout circuit as a backup for a column readout circuit having defects. However, such doings needs a massive decoder for addressing a location of the column readout circuit having defects in the column readout circuit array, resulting in that circuit area and production cost are increased significantly. Besides, since the entire column of pixels originally coupled to the column readout circuit that needs to be repaired is switched to couple to the redundant readout circuit located mostly outside the column readout circuit array, the output load of the entire column of pixels is increased significantly, such that differences between each column in the pixel array become larger, which leads to operation difficulties.

SUMMARY OF THE INVENTION

It is therefore a primary objective of the present invention to provide an image sensor and related method with functions of repairing column readout circuits The present invention discloses an image sensor with functions of repairing column readout circuits. The image sensor includes a pixel array having a plurality of pixel column groups, a column readout circuit array having a plurality of column readout circuit groups set in a row along a first direction and a redundant column readout circuit group set on a first side of the plurality of column readout circuit groups along the first direction, an addressing unit and a repair unit coupled to the pixel array, the column readout circuit array and the addressing unit. Each column readout circuit group of the plurality of column readout circuit groups is individually coupled to a pixel column group of the pixel array in order and includes a specific number of column readout circuits for reading out pixel values of each pixel column of the pixel column group, respectively. The redundant column readout circuit group includes a plurality of redundant column readout circuits, of which the number is equal to the specific number. The addressing unit is utilized for generating a repair control signal according to a location of a first column readout circuit group of the plurality of column readout circuit groups in the column readout circuit array when column readout circuits of the first column readout circuit group have defects. The repair unit is utilized for switching all pixel column groups, originally coupled to column readout circuit groups starting from the first column readout circuit group along the first direction, to individually couple to column readout circuit groups starting from a second column readout circuit group along the first direction and the redundant column readout circuit group in order according to the repair control signal, wherein the second column readout circuit group is a column readout circuit group next to the first column readout circuit group along the first direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
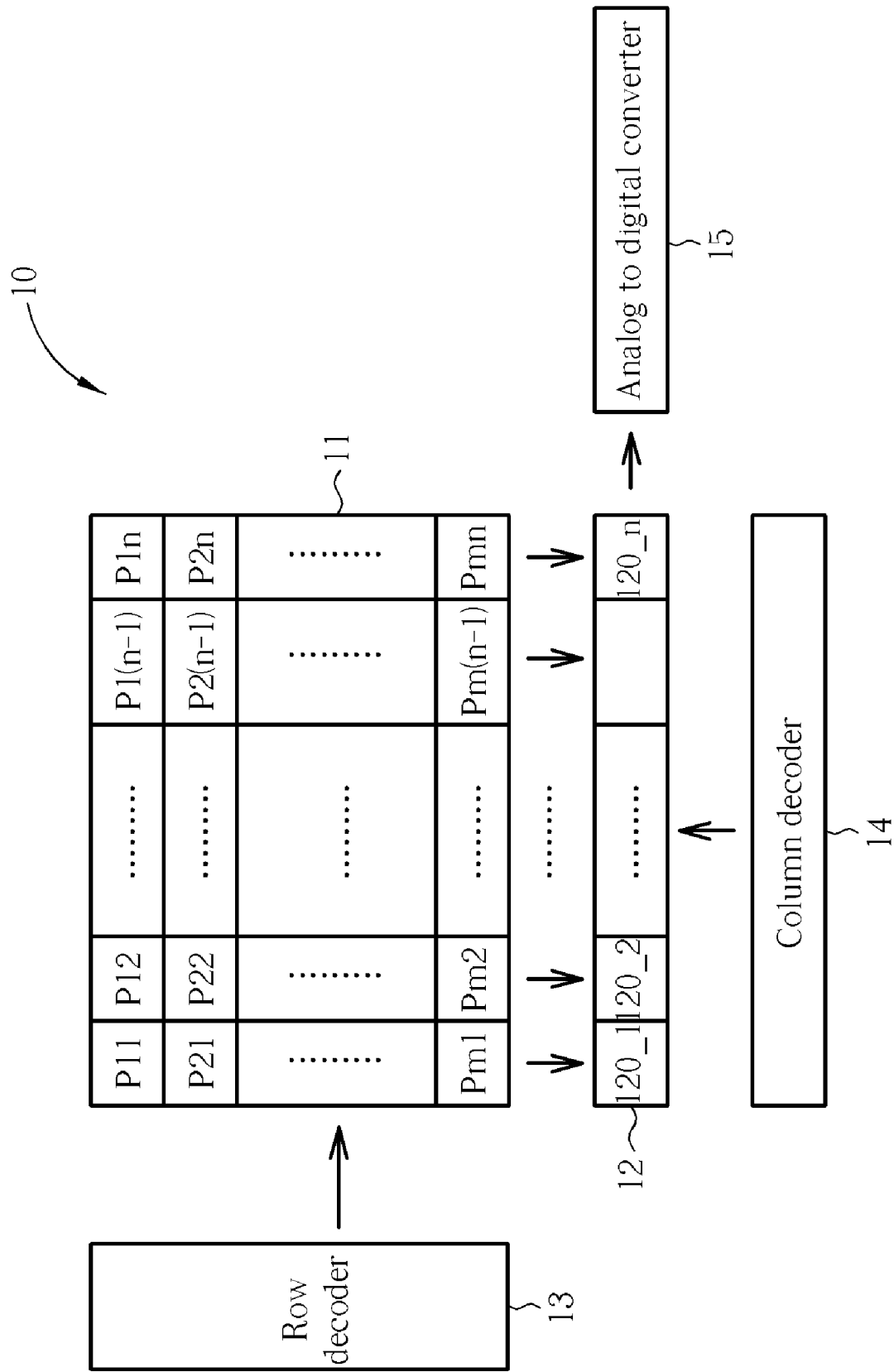
FIG. 1 is a schematic diagram of a conventional CMOS image sensor.
Figure 2:
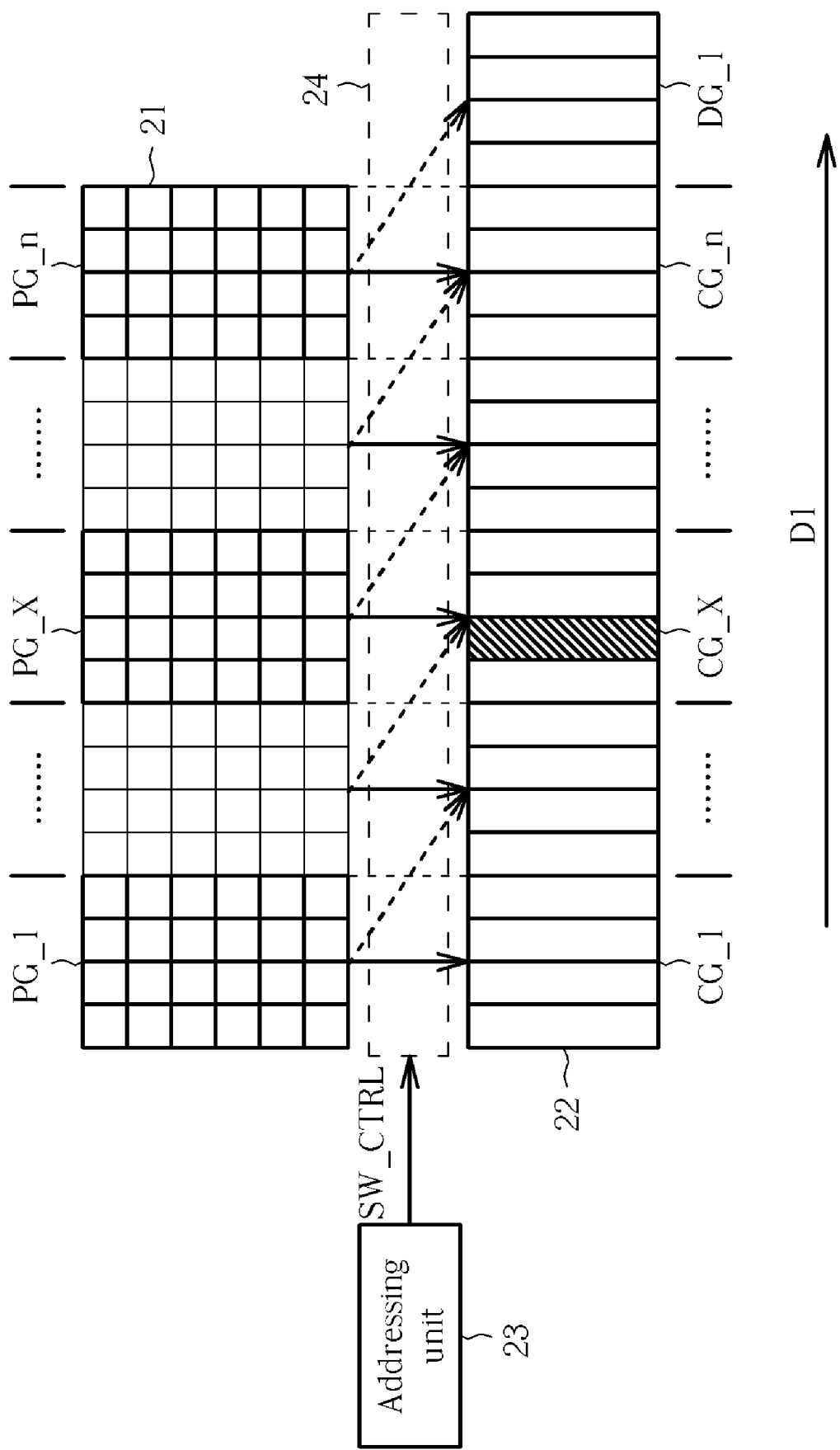
FIG. 2 is a schematic diagram of an image sensor with functions of repairing column readout circuits according to the present invention.

Please refer to FIG. 2. FIG. 2 is a schematic diagram of an image sensor 20 with functions of repairing column readout circuits according to the present invention. The image sensor 20 includes a pixel array 21, a column readout circuit array 22, an addressing unit 23 and a repair unit 24. The pixel array 21 is composed of unit pixels arranged in a matrix form, and can be divided into pixel column groups PG_1~PG_n. The column readout circuit array 22 includes column readout circuit groups CG_1~CG_n and a redundant column readout circuit group DG_1. The column readout circuit groups CG_1~CG_n are set in a row along a first direction D1, and are individually coupled to the pixel column groups PG_1~PG_n, among which each column readout circuit group further includes a specific number of column readout circuits for respectively reading out pixel values of each pixel column of the coupled pixel column group. The redundant column readout circuit group DG_1 is arranged on a side of the column readout circuit groups CG_1~CG_n, and includes a plurality of redundant column readout circuits, of which the number is equal to the specific number. The addressing unit 23 is utilized for generating a repair control signal SW_CTRL according to a location of a column readout circuit group CG_x of the column readout circuit groups CG_1~CG_n in the column readout circuit array 22 when column readout circuits of the column readout circuit group CG_x have defects, wherein x represents a number among 1 to n. The repair unit 24 is coupled between the pixel array 21 and the column readout circuit array 22, and is utilized for switching all pixel column groups starting from a pixel column groups PG_x, originally coupled to the column readout circuit group CG_x, along the first direction D1 (i.e. the pixel column groups PG_x~PG_n) to individually couple to column readout circuit groups starting from a column readout circuit group next to the column readout circuit group CG_x along the first direction D1 and the redundant column readout circuit group DG_1 (i.e. the column readout circuit groups CG_(x+1)~CG_n) in order according to the repair control signal SW_CTRL.

Figure 3:
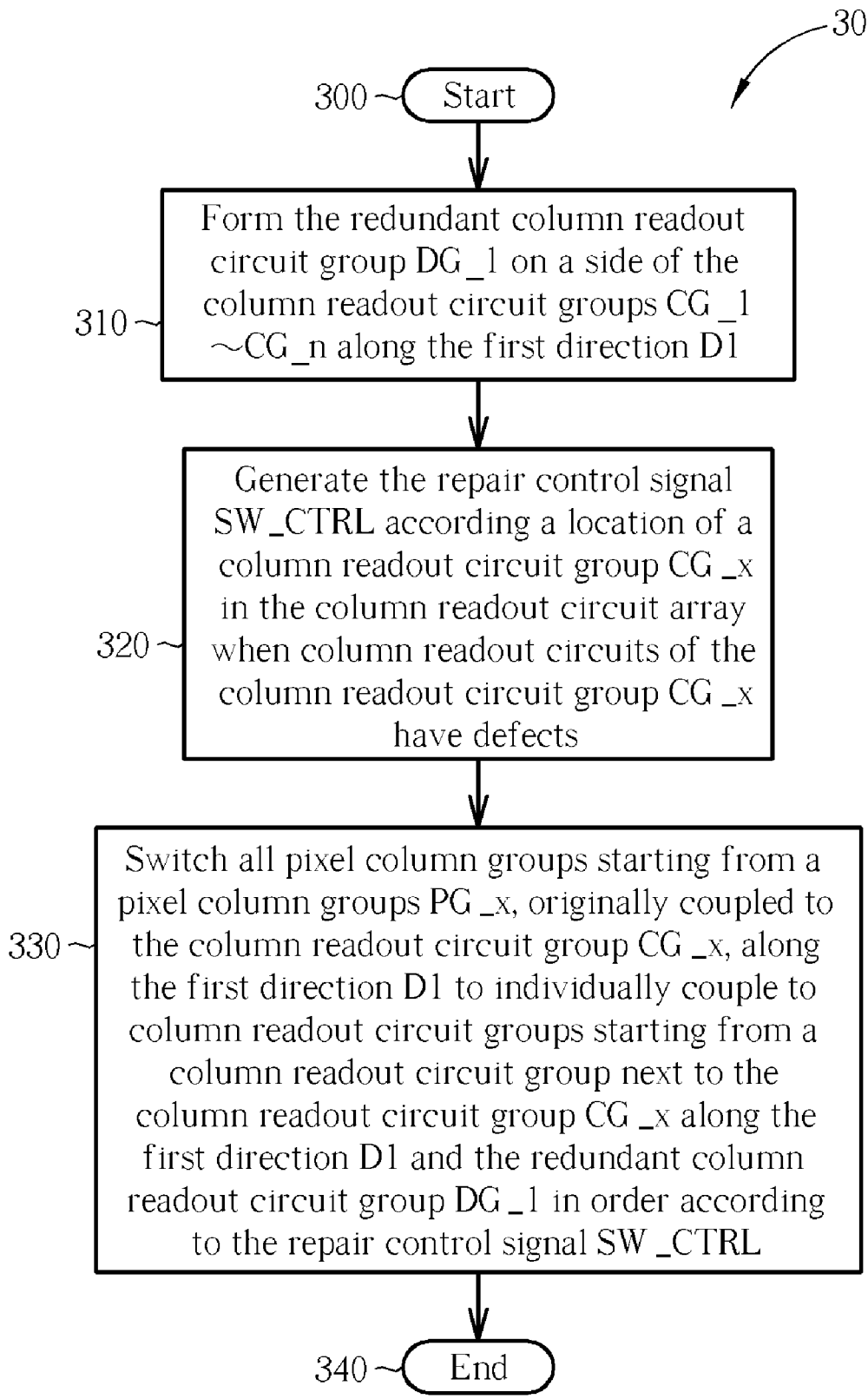
FIG. 3 is a schematic diagram of a process for repairing an image sensor according to the present invention.

Please further refer to FIG. 3. FIG. 3 is a schematic diagram of a process 30 for repairing an image sensor according to the present invention. The process 30 is utilized for realizing the image sensor 20, and includes the following steps:

Step 300: Start.

Step 310: Form the redundant column readout circuit group DG_1 on a side of the column readout circuit groups CG_1~CG_n along the first direction D1.

Step 320: Generate the repair control signal SW_CTRL according a location of a column readout circuit group CG_x in the column readout circuit array 22 when column readout circuits of the column readout circuit group CG_x have defects.

Step 330: Switch all pixel column groups starting from a pixel column groups PG_x, originally coupled to the column readout circuit group CG_x, along the first direction D1 to individually couple to column readout circuit groups starting from a column readout circuit group next to the column readout circuit group CG_x along the first direction D1 and the redundant column readout circuit group DG_1 in order according to the repair control signal SW_CTRL.

Step 340: End.

According to the process 30, the present invention forms the redundant column readout circuit group DG_1 on a side of the column readout circuit groups CG_1~CG_n, and generates the repair control signal SW_CTRL according to the location of the column readout circuit group CG_x in the column readout circuit array 22 when column readout circuits of the column readout circuit group CG_x have defects. Thus, the present invention can switch all pixel column groups starting from the pixel column groups PG_x, originally coupled to the column readout circuit group CG_x, along the first direction D1 to individually couple to column readout circuit groups starting from the column readout circuit group next to the column readout circuit group CG_x along the first direction D1 and the redundant column readout circuit group DG_1 in order according to the repair control signal SW_CTRL. That means, when there exist defects on any column readout circuits of the image sensor 20, the present invention can repair the column readout circuits having defects on a group basis, and can shift the pixel column group originally coupled to the column readout circuit group that need to be repaired and all following pixel column groups to individually couple to a next column readout circuit group and the redundant column readout circuit group DG1 in order. Therefore, the present invention not only can simplify circuit complexity of the addressing unit 23 for saving production cost, but can also prevent difficulties of operation due to too much output load differences between each pixel column in the pixel array 21.

Preferably, the image sensor 20 is an CMOS image sensor, and each column readout circuit can be a simple voltage or charge amplifier or can further be realized by a correlation double sampling (CDS) circuit. In addition, the present invention divides all pixel columns of the pixel array and all column readout circuits into groups, and the number of the groups is preferred to be the power of 2 such as 2, 4, 8, 16, 32 and etc. for facilitating implementation of the addressing unit. Thus, the number of column readout circuits in each column readout circuit group depends on the number of the column readout circuit groups divided in the image sensor 20, and no matter how many column readout circuits that have defects are included in a same group, all can be repaired by a redundant column readout circuit group in the present invention. The more the column readout circuit groups are divided, the larger circuit area is required by the addressing unit 23, and the less the number of the redundant column readout circuits is needed.

Figure 4:
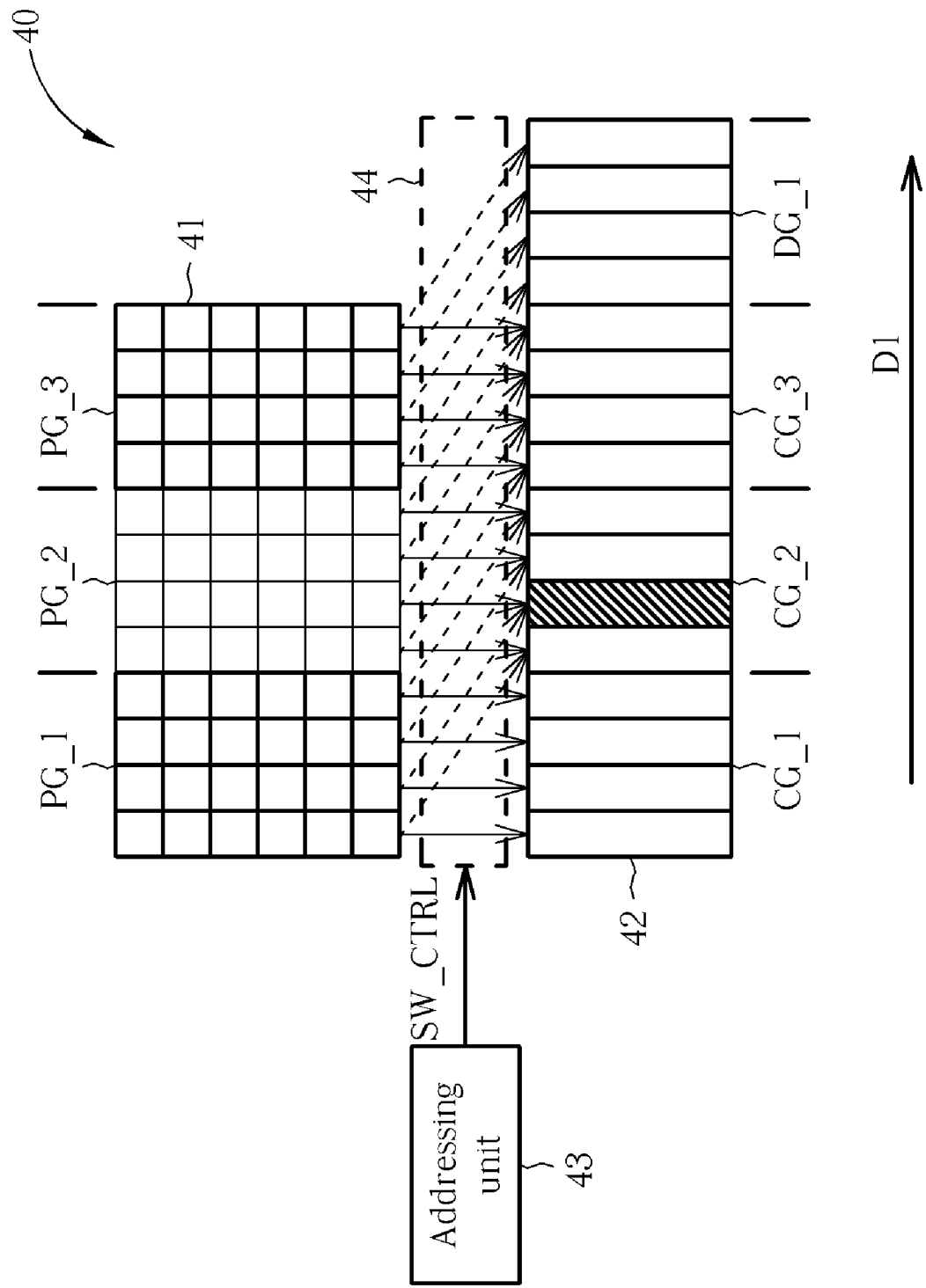
FIG. 4 is a schematic diagram of an image sensor with functions of repairing column readout circuits according to an embodiment of the present invention.
Figure 5:
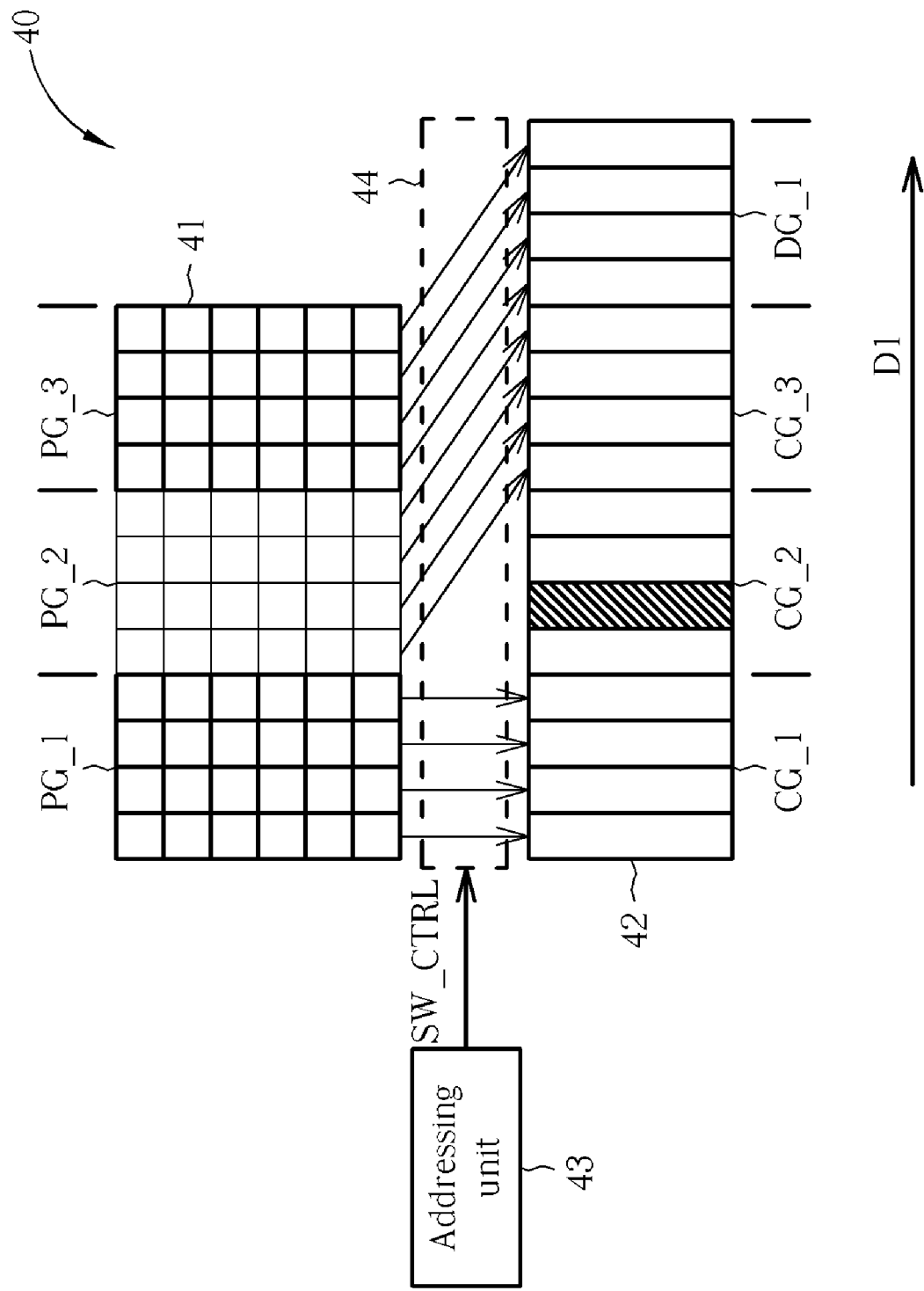
FIG. 5 shows related circuit connections of the image sensor after repaired in FIG. 4.

Please refer to FIG. 4. FIG. 4 is a schematic diagram of an image sensor 40 with functions of repairing column readout circuits according to an embodiment of the present invention. The image sensor 40 is an exemplary embodiment of the image sensor 20. In the image sensor 40, a column readout circuit array 42 includes column readout circuit groups CG_1~CG_3 and a redundant column readout circuit group DG_1; and a repair unit 44 includes a plurality of switches, of which the number is equal to that of pixel column units in a pixel array 41, and is utilized for switching each pixel column unit to individually couple to one of corresponding column readout circuits in adjacent column readout circuit groups. In this case, if there exists a damaged column readout circuit in the column readout circuit group CG2, the addressing unit 43 can then generate a repair control signal SW_CTRL according to the location of the column readout circuit group CG2 in the column readout circuit array 42, and the repair unit 44 can be controlled accordingly to enable the switches corresponding to the pixel column groups PG_2 and PG_3 for shifting pixel column units in the pixel column groups PG_2 and PG_3 to individually couple to column readout circuits in the column readout circuit group CG_3 and the redundant column readout circuit group DG_1. Thus, functions of the column readout circuit groups CG_2 and CG_3 are replaced by the column readout circuit group CG_3 and the redundant column readout circuit group DG_1, respectively. The related circuit connection of the image sensor 40 being repaired is as shown in FIG. 5. Please note that, the embodiment of the present invention is merely an exemplary illustration, and those skilled in the art can certainly make appropriate modifications according to practical demands, such as the number of column readout circuit groups, which also belongs to the scope of the present invention.

Figure 6:
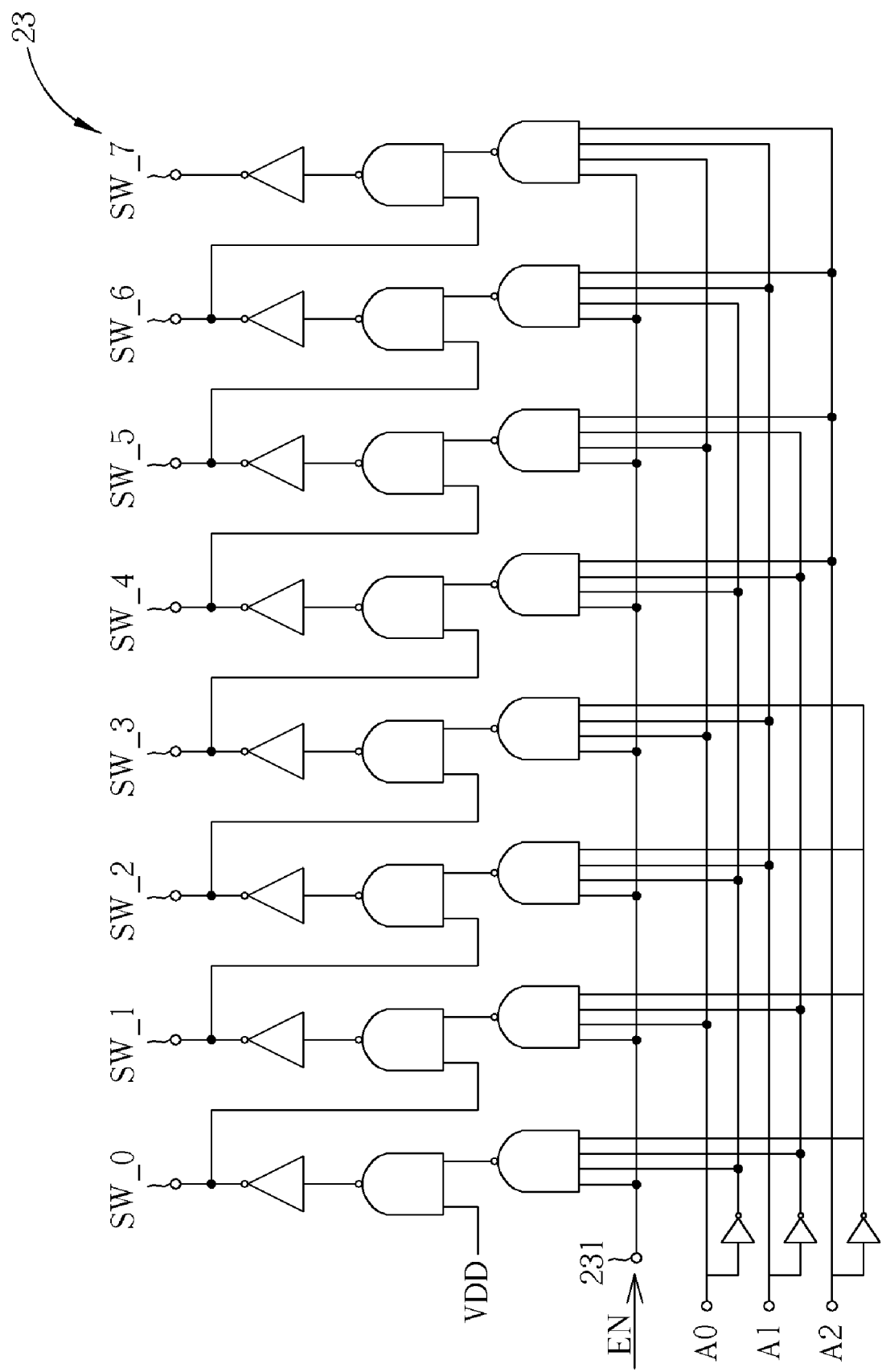
FIG. 6 is a schematic diagram of an embodiment of the addressing unit in FIG. 2.

On the other hand, the addressing unit 23 of the present invention is utilized for generating the repair control signal SW_CTRL for controlling the repair unit 24 to perform corresponding repair operations according to the location of the column readout circuit group that has defects, and thus can preferably be implemented by a decoder. For example, please refer to FIG. 6. FIG. 6 is a schematic diagram of an embodiment of the addressing unit 23 in FIG. 2. In FIG. 6, the addressing unit 23 is designed for an image sensor with eight column readout circuit groups, and detailed description is illustrated in the following. An enable terminal 231 is utilized for receiving an enabling signal EN. When the enabling signal EN has a high logic level, the repair operation of the image sensor 20 is enabled; and conversely, when the enabling signal is low, the image sensor 20 switches off the function for repairing the column readout circuits. Address input terminals A_0~A_2 are utilized for inputting an address signal corresponding to the location of the column readout circuit group that has defects, and output terminals SW_0~SW_7 are utilized for outputting signals to form the repair control signal SW_CTRL. For example, when the address signal inputted into the address input terminals A_0~A_2 are (1, 1, 0), indicating that the column readout circuit group having defects is the fourth column readout circuit group in the column readout circuit array along the first direction D1, the addressing unit 23 then outputs the signals (1, 1, 1, 0, 0, 0, 0, 0) from the output terminals SW_0~SW_7 to form the repair control signal SW_CTRL, which controls the repair unit 24 to switch all pixel column groups located after the fourth pixel column group to individually couple to a next column readout circuit group and the redundant column readout circuit group DG1.

Figure 7:
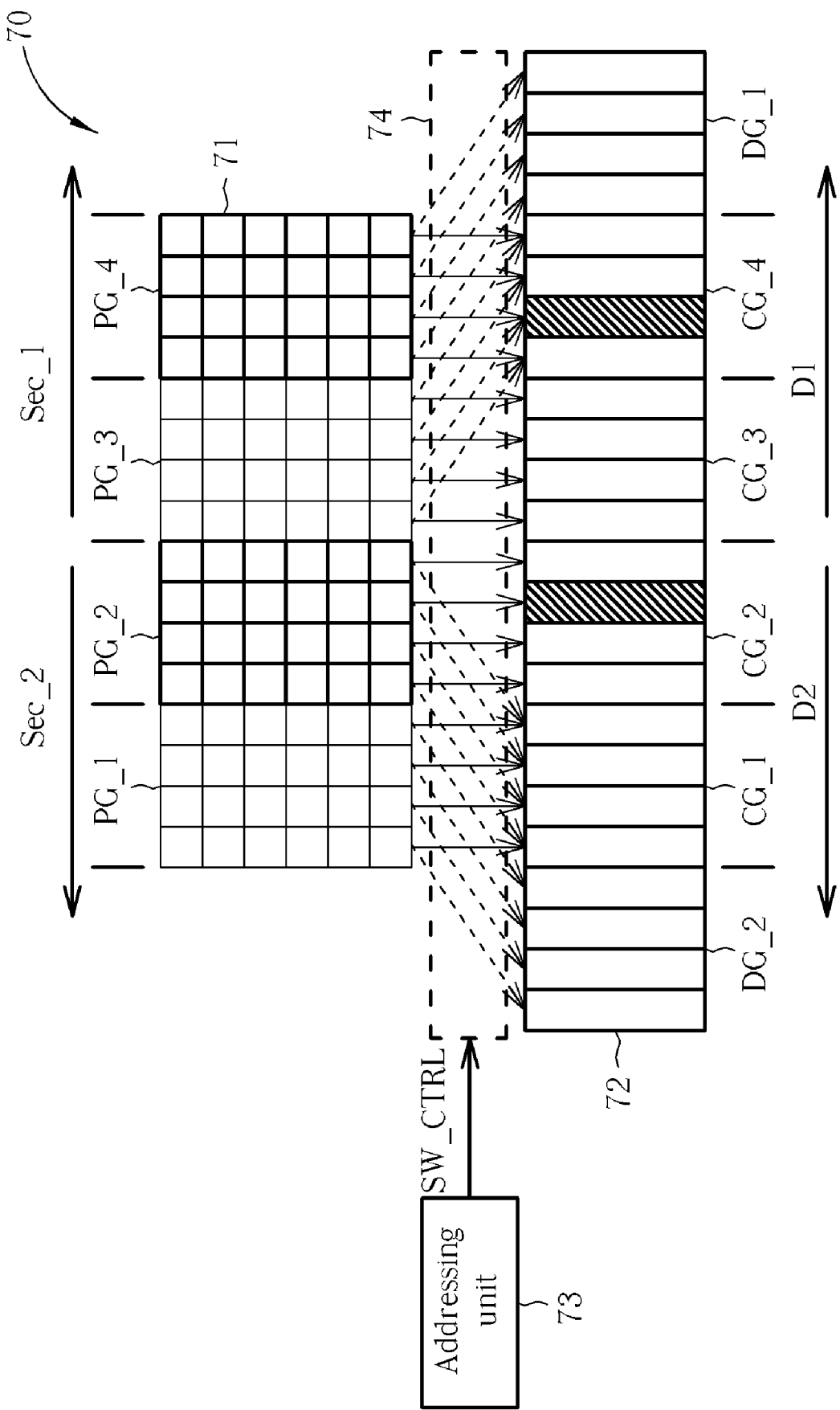
FIG. 7 is a schematic diagram of an image sensor 70 with functions of repairing column readout circuits according to another embodiment of the present invention.
Figure 8:
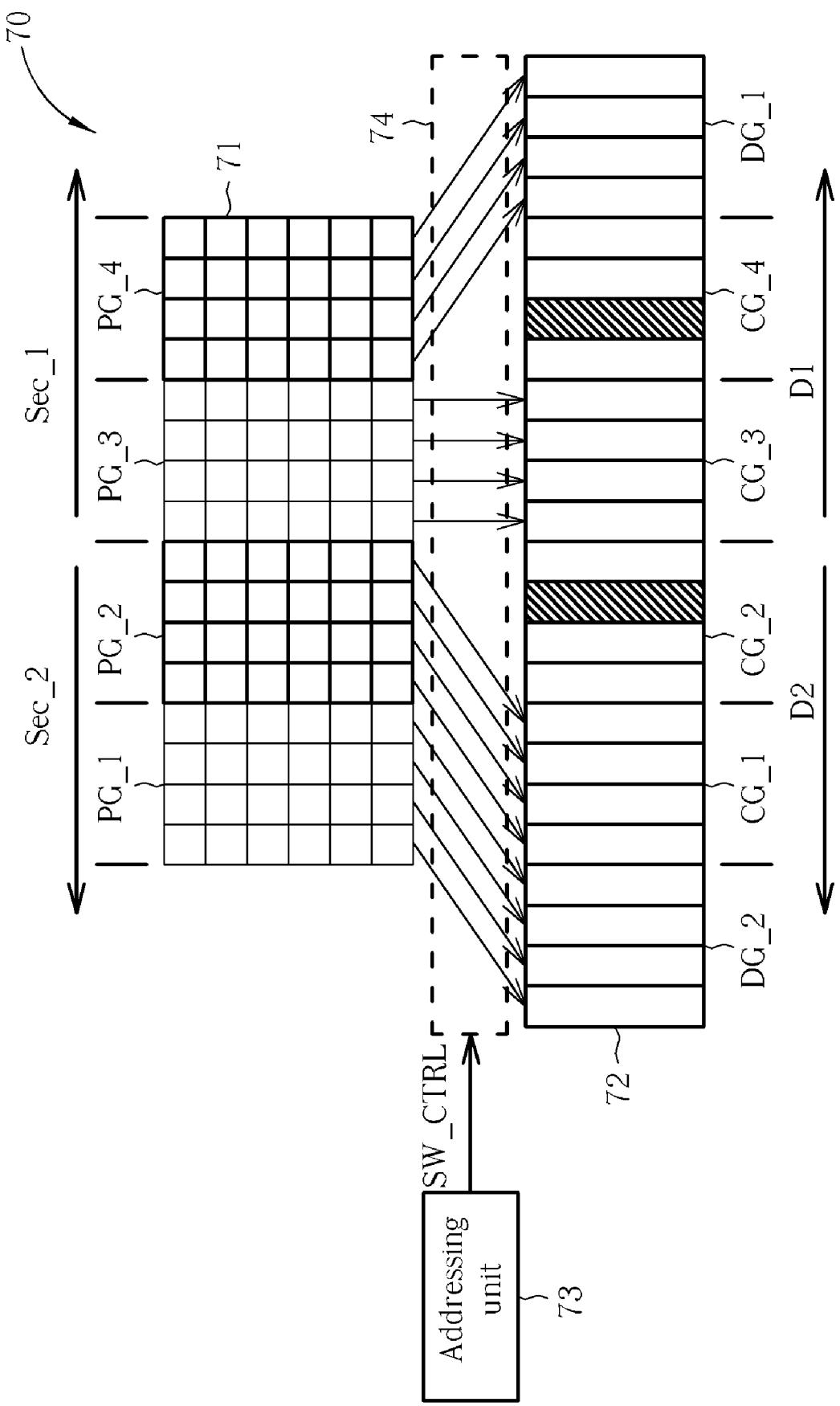
FIG. 8 shows related circuit connections of the image sensor after repaired in FIG. 7.

Additionally, the present invention can form another redundant column readout circuit group on the other side of the column readout circuit array for enhancing flexibility of repair. Please refer to FIG. 7. FIG. 7 is a schematic diagram of an image sensor 70 with functions of repairing column readout circuits according to another embodiment of the present invention. The image sensor 70 is substantially similar to the image sensor 40, and the difference is that a column readout circuit array 72 further includes a second redundant column readout circuit group DG_2 arranged on the other side of the column readout circuit array 72. When in operation, the present invention can divide the image sensor 70 into a first section SEC_1 and a second section SEC_2 as shown in FIG. 7. In this case, the redundant column readout circuit group DG_1 is responsible for the repair operation of a column readout circuit group having defects in the first section SEC_1; and conversely, if the column readout circuit group having defects is located in the second section SEC_2, the present invention then utilizes the redundant column readout circuit group DG_2 for performing the repair operation by shifting the other column readout circuit group in order along a direction D2 apposite to the direction D1. The related circuit connection of the image sensor 40 being repaired is as shown in FIG. 8. Thus, in the present invention, two column readout circuit groups can be repaired simultaneously, so that flexibility of use can be enhanced significantly.

As mentioned above, the present invention repairs the column readout circuits with defects on a group basis, and shifts the pixel column group originally coupled to the column readout circuit group that need to be repaired and all followed pixel column groups to individually couple to a next column readout circuit group and the redundant column readout circuit group in order. Therefore, the present invention not only can save circuit area of the image sensor for saving production cost, but can also prevent from operation difficulties due to too much output load differences between each pixel column in the pixel array.

Those skilled in the art will readily observe that numerous modifications and alterations of the device and method may be made while retaining the teachings of the invention.

What is claimed is:

1. An image sensor with functions of repairing column readout circuits comprising:
   a pixel array comprising a plurality of pixel column groups;
   a column readout circuit array comprising:
      a plurality of column readout circuit groups, set in a row along a first direction, each column readout circuit group of the plurality of column readout circuit groups is individually coupled to a pixel column group of the pixel array in order and comprises a specific number of column readout circuits for reading out pixel values of each pixel column of the pixel column group, respectively; and
      a redundant column readout circuit group, set on a first side of the plurality of column readout circuit groups along the first direction, comprising a plurality of redundant column readout circuits, the number of the plurality of redundant column readout circuits is equal to the specific number;
   an addressing unit for generating a repair control signal according to a location of a first column readout circuit group of the plurality of column readout circuit groups in the column readout circuit array when column readout circuits of the first column readout circuit group have defects; and
   a repair unit, coupled to the pixel array, the column readout circuit array and the addressing unit, for switching all pixel column groups, originally coupled to column readout circuit groups starting from the first column readout circuit group along the first direction, to individually couple to column readout circuit groups starting from a second column readout circuit group along the first direction and the redundant column readout circuit group in order according to the repair control signal, wherein the second column readout circuit group is a column readout circuit group next to the first column readout circuit group along the first direction.

2. The image sensor of claim 1, wherein the column readout circuit array further comprises a second redundant column readout circuit group, the second redundant column readout circuit group is set on a second side of the plurality of column readout circuit groups and comprises a plurality of redundant column readout circuits, the number of the plurality of redundant column readout circuits is equal to the specific number.

3. The image sensor of claim 1, wherein the column readout circuit is a correlative double sampling (CDS) circuit.

4. The image sensor of claim 1, wherein the column readout circuit is an amplifier.

5. The image sensor of claim 1, wherein the repair unit comprises a plurality of repair groups individually corresponding to the plurality of pixel column groups of the pixel array, each repair group of the plurality of repair groups further comprising a plurality of switches, the number of the plurality of switches is equal to the specific number.

6. The image sensor of claim 1, wherein the addressing unit is a decoder.

7. The image sensor of claim 1 wherein the image sensor is a CMOS image sensor.

8. A method for repairing an image sensor, the image sensor comprising a pixel array and a column readout circuit array, the column readout circuit array comprising a plurality of column readout circuit groups set in a row along a first direction, each column readout circuit group of the plurality of column readout circuit groups is individually coupled to a pixel column group of the pixel array and comprises a specific number of column readout circuits for reading out pixel values of each pixel column of the pixel column group, the method comprising:

forming a redundant column readout circuit group on a first side of the plurality of column readout circuit groups along the first direction, the redundant column readout circuit group comprising a plurality of redundant column readout circuits, the number of the plurality of redundant column readout circuits is equal to the specific number;

generating a repair control signal according a position of a first column readout circuit group of the plurality of column readout circuit groups when column readout circuits of the first column readout circuit group have defects; and switching all pixel column groups, originally coupled to column readout circuit groups starting from the first column readout circuit group along the first direction, to individually couple to column readout circuit groups starting from a second column readout circuit group along the first direction and the redundant column readout circuit group in order according to the repair control signal, wherein the second column readout circuit group is a column readout circuit group next to the first column readout circuit group along the first direction.

9. The method of claim 8 further comprising:
forming a second redundant column readout circuit group on a second side of the plurality of column readout circuit groups, the second redundant column readout circuit group comprising a plurality of redundant column readout circuits, the number of the plurality of redundant column readout circuits is equal to the specific number.

10. The method of claim 8, wherein the column readout circuit is a correlative double sampling (CDS) circuit.

11. The method of claim 8, wherein the column readout circuit is an amplifier.

12. The method of claim 8, wherein the repair control signal is generated by an addressing unit.

13. The method of claim 12, wherein the addressing unit is a decoder.

14. The method of claim 8, wherein the image sensor is an CMOS image sensor.

* * * * *